US010183308B2

(12) United States Patent
Choi et al.

(10) Patent No.: US 10,183,308 B2
(45) Date of Patent: Jan. 22, 2019

(54) SPRAYING DEVICE

(71) Applicant: Conopco, Inc., Englewood Cliffs, NJ (US)

(72) Inventors: Hei Wai Choi, Hong Kong (CN); David Keith Dycher, Shenzhen (CN); Xin Shen, Shenzhen (CN); Gregory Clegg Spooner, Hong Kong (CN); Shao Jun Zhang, Shenzhen (CN)

(73) Assignee: Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 15/518,296

(22) PCT Filed: Sep. 29, 2015

(86) PCT No.: PCT/EP2015/072418

§ 371 (c)(1),
(2) Date: Apr. 11, 2017

(87) PCT Pub. No.: WO2016/058824

PCT Pub. Date: Apr. 21, 2016

(65) Prior Publication Data

US 2017/0259292 A1 Sep. 14, 2017

(30) Foreign Application Priority Data

Oct. 14, 2014 (EP) .................................... 14188875

(51) Int. Cl.
*G01F 11/00* (2006.01)
*G01F 13/00* (2006.01)
(Continued)

(52) U.S. Cl.
CPC .............. *B05B 15/70* (2018.02); *B05B 12/12* (2013.01); *B05B 15/16* (2018.02); *E03D 9/002* (2013.01); *E03D 9/005* (2013.01)

(58) Field of Classification Search
CPC ....... B05B 15/70; B05B 15/16; B05B 15/001; B05B 15/10; B05B 12/12; E03D 9/002
(Continued)

(56) References Cited

U.S. PATENT DOCUMENTS 2,605,478 A 8/1952 Lassiter
3,018,056 A 1/1962 Montgomery
(Continued)

FOREIGN PATENT DOCUMENTS

CH 672873 1/1990
DE 316560 4/1919
(Continued)

OTHER PUBLICATIONS

IPRP in PCTEP2015072418, dated Sep. 19, 2016.
(Continued)

*Primary Examiner* — Benjamin R Shaw
(74) *Attorney, Agent, or Firm* — Ronald A. Koatz

(57) ABSTRACT

A compact spraying device (10) connectable to a surface and for spraying a fluid comprises a housing (16) with an inlet (20), a pump (28) in fluid communication with the inlet (20), a retractable nozzle (24) in fluid communication with the pump (28), a nozzle cover (22) and a drive system (30). The retractable nozzle (24) selectively extends forward relative to a front side of the housing (16) into a spraying position for spraying the fluid and retracts inside the housing to a retracted position when not spraying. The nozzle cover (22) is selectively moveable from a closed position in which the cover (22) covers the nozzle (24) when the nozzle (24) is in a retracted position, to an open position in which the cover (22) moves to allow the nozzle (24) to extend into the spraying position. The drive system (30) moves the retractable nozzle (24) and the nozzle cover (22) and operates the pump (28).

14 Claims, 6 Drawing Sheets

(51) Int. Cl.

| | |
|---|---|
| ***B05B 15/70*** | (2018.01) |
| ***B05B 15/16*** | (2018.01) |
| ***E03D 9/00*** | (2006.01) |
| ***B05B 12/12*** | (2006.01) |

(58) Field of Classification Search
USPC .................................................. 222/223, 182
See application file for complete search history.

(56) References Cited

U.S. PATENT DOCUMENTS

| | | | | |
|---|---|---|---|---|
| 3,739,944 | A | 6/1973 | Rogerson | |
| 4,159,791 | A | 7/1979 | Crutcher | |
| 4,235,373 | A | 11/1980 | Clark | |
| 4,319,614 | A | 3/1982 | Boice | |
| 5,029,736 | A | 7/1991 | Maruyama et al. | |
| 5,149,506 | A | 9/1992 | Skiba et al. | |
| 5,181,630 | A | 1/1993 | McNally | |
| 5,249,718 | A | 10/1993 | Muderlak | |
| 5,292,071 | A * | 3/1994 | Kruer .................... | B05B 3/0431 239/242 |
| 5,454,123 | A | 10/1995 | Barabino | |
| 5,476,198 | A | 12/1995 | Jouillat et al. | |
| 5,702,056 | A | 12/1997 | Yang | |
| 5,906,009 | A | 5/1999 | Sakar | |
| D438,979 | S | 3/2001 | Gomes et al. | |
| 6,439,476 | B1 * | 8/2002 | Boggs ..................... | B05B 15/16 239/203 |
| 6,440,373 | B1 | 8/2002 | Gomes et al. | |
| 2002/0066749 | A1 | 6/2002 | De Laforcade | |
| 2002/0108952 | A1 | 8/2002 | Delman et al. | |
| 2006/0065326 | A1 | 3/2006 | Shingle | |
| 2006/0151548 | A1 | 7/2006 | Seris et al. | |
| 2007/0034711 | A1 * | 2/2007 | Kah, Jr. .................. | B05B 15/70 239/205 |
| 2008/0142555 | A1 | 6/2008 | Marin et al. | |
| 2009/0108088 | A1 * | 4/2009 | Bredberg ................ | B05B 15/70 239/1 |
| 2009/0159620 | A1 | 6/2009 | Nielsen | |
| 2009/0249533 | A1 | 10/2009 | Sawalski et al. | |
| 2010/0147903 | A1 | 6/2010 | Farside | |
| 2012/0144569 | A1 * | 6/2012 | Kodat .................. | A47K 13/302 4/222 |
| 2013/0025038 | A1 | 1/2013 | Frey et al. | |
| 2013/0193225 | A1 * | 8/2013 | DeWitt ................... | B05B 15/70 239/1 |
| 2013/0270361 | A1 * | 10/2013 | Clark ...................... | B05B 15/70 239/205 |
| 2014/0061243 | A1 * | 3/2014 | Goettke .............. | B05B 11/3001 222/182 |

FOREIGN PATENT DOCUMENTS

| | | |
|---|---|---|
| DE | 2851139 | 6/1980 |
| DE | 8527501 | 11/1985 |
| DE | 19908779 | 12/1999 |
| DE | 19945075 | 4/2000 |
| DE | 102011001512 | 9/2012 |
| DE | 202012002839 | 8/2013 |
| EP | 0082439 | 6/1983 |
| EP | 0194407 | 9/1986 |
| EP | 1467820 | 10/2004 |
| EP | 2071087 | 6/2009 |
| EP | 2775051 | 9/2014 |
| FR | 2411277 | 7/1979 |
| FR | 2610815 | 8/1990 |
| FR | 2669007 | 5/1992 |
| FR | 2674204 | 9/1992 |
| FR | 2868343 | 10/2005 |
| GB | 1562052 | 3/1980 |
| JP | 47008547 | 10/1972 |
| JP | 48041630 | 5/1973 |
| JP | 1130965 | 3/1989 |
| JP | 1179856 | 12/1989 |
| JP | 2048566 | 4/1990 |
| JP | 2048567 | 4/1990 |
| JP | 2066453 | 5/1990 |
| JP | 2148962 | 12/1990 |
| JP | 3053459 | 5/1991 |
| JP | 4001093 | 1/1992 |
| JP | 6003858 | 1/1994 |
| JP | 9099964 | 4/1997 |
| WO | WO9222466 | 12/1992 |
| WO | WO9424253 | 10/1994 |
| WO | WO9963877 | 12/1999 |
| WO | WO02084034 | 10/2002 |
| WO | WO03099452 | 12/2003 |
| WO | WO03102315 | 12/2003 |
| WO | WO2004093625 | 11/2004 |
| WO | WO2006038005 | 4/2006 |
| WO | WO2007075819 | 7/2007 |
| WO | WO2008010112 | 1/2008 |
| WO | WO2010140471 | 12/2010 |
| WO | WO2010141087 | 12/2010 |
| WO | WO2011061478 | 5/2011 |
| WO | WO2011101194 | 8/2011 |
| WO | WO2012156170 | 11/2012 |
| WO | WO2013017393 | 2/2013 |

OTHER PUBLICATIONS

Search Report in EP14188874, dated Mar. 23, 2015, EP.
Search Report in EP14188875, dated Mar. 16, 2015, EP.
Search Report in EP14188876, dated Mar. 17, 2015.
Search Report in PCTEP2015070469, dated Nov. 30, 2015.
Search Report in PCTEP2015072315, dated Jan. 12, 2015.
Search Report in PCTEP2015072418, dated Nov. 19, 2015.
Written Opinion in EP14188874, dated Mar. 23, 2015, EP.
Written Opinion in EP14188875, dated Mar. 16, 2015.
Written Opinion in EP14188876, dated Mar. 17, 2015.
Written Opinion in PCTEP2015070469, dated Nov. 30, 2015.
Written Opinion in PCTEP2015072315, dated Jan. 2, 2015.
Written Opinion in PCTEP2015072418, dated Nov. 19, 2015.

* cited by examiner

SPRAYING DEVICE

BACKGROUND

Spraying devices can work to clean surfaces and/or enclosed areas, preferably while reducing the manual work previously required for such a task. In relation to a spraying device for cleaning a toilet, such devices can help to reduce the undesirable bacteria and virus particles sent into the air and surrounding area every time the toilet is flushed.

There are a number of systems which have been developed to try to prevent the spread of active airborne micro-organisms and viruses from a toilet after flushing. U.S. Pat. No. 5,906,009 discloses a toilet bowl that has gases and bacteria or virus-laden mist removed directly there from by an air evacuation system, both during and after use of the toilet. This system requires a special toilet bowl and a separate and relatively expensive air evacuation system. WO00/01423 discloses a method of disinfecting or sanitising a space occupied by airborne micro-organisms and/or viruses, which method comprises directing into the space unipolar charged liquid droplets from a spray device containing a disinfecting or sanitising composition. The preferred spray device is a domestic pressure-spraying device capable of being hand held.

EP1467820 discloses an automated sprayer for spraying an enclosure with a liquid cleanser, whereby the sprayer contains a reservoir for holding the liquid cleanser, a pump in fluid communication with the reservoir and a movable spray head having an outlet orifice through which cleanser from the reservoir can be expelled during operation of the pump. The sprayer disclosed by this document also contains an electric motor drive mechanism for operating the pump and also simultaneously moving the spray head in a rotating direction. Although it is mentioned in EP1467820 that the enclosure could suitably be a toilet bowl (with the lid in closed position), the automated sprayer is sized for and is disclosed in said document to be mainly for use in bath and shower enclosures.

WO2012/156170 discloses an automated spraying device for spraying an enclosure with a liquid cleaner. The device has a reservoir for containing the liquid cleanser, a pump in fluid communication with the reservoir and a movable spray head having an outlet orifice through which cleanser from the reservoir can be expelled. The spraying device contains an electrical motor drive mechanism for sequentially operating the pump and moving the spray head so that the spray head is not simultaneously spraying and moving.

A number of toilet cleaning devices extend into the toilet to provide a more thorough cleaning, including EP2071087 A2 and DE19908779 A1. DE19908779 A1 discloses a cleaning member at the end of an extendable column of bellows. The cleaning member can have nozzles for spraying, bristles for scrubbing or both and extends into the toilet bowl for the spraying and/or scrubbing operation. EP2071087 A2 discloses a self cleaning toilet with a special toilet cover that has a hollow body for housing a cleaning mechanism. The cleaning nozzle body of the cleaning mechanism can extend into the toilet through a telescoping and scissor lattice arrangement. Each of these extend the cleaning mechanism deep into the toilet bowl for cleaning, requiring a large amount of moving parts for the large range of motion.

Therefore, there remains a need to improve the safety, reliability, hygienic performance and/or other aspects of spraying devices for spraying a fluid. In particular there exists such a need with regard to such spraying devices for use in a toilet.

SUMMARY

According to a first aspect of the invention, a compact spraying device connectable to a surface and for spraying a fluid comprises a housing with an inlet, a pump in fluid communication with the inlet, a retractable nozzle in fluid communication with the pump, a nozzle cover and a drive system. The retractable nozzle selectively extends forward relative to a front side of the housing into a spraying position for spraying the fluid and retracts inside the housing to a retracted position when not spraying. The nozzle cover is selectively moveable from a closed position in which the cover covers the nozzle when the nozzle is in a retracted position, to an open position in which the cover moves to allow the nozzle to extend into the spraying position. The drive system moves the retractable nozzle and the nozzle cover and operates the pump. The movements of the nozzle and nozzle cover and the operation of the pump can be simultaneous or at least partially simultaneous.

The spraying device provides a compact system which can be connected to another surface to spray a fluid which can be used for cleaning, deodorizing, disinfecting and/or sanitizing an area or a surface. The compact design allows it to be used with standard products, for example with a standard toilet, attaching it to the toilet lid for spraying into the toilet bowl. The retractable nozzle and nozzle cover allow for a wide spray angle and for protecting against leakage and/or residual fluid on the nozzle coming into contact with something else. This could be useful if a vortex nozzle were used to produce a wide angle spray. The drive system being able to simultaneously move the nozzle, cover and operate the pump makes for a compact system with minimal moving parts, contributing to the overall efficiency and reliability of the system. Such a system can also contribute to the cleanliness and/or safety of the system in certain applications. For example, when used as a consumer device and the fluid contains chemicals or other ingredients which could be harmful to skin or clothing, the retractable nozzle and nozzle cover ensure that the fluid does not come into contact with skin, clothing or other items that could be stained and/or damaged by the fluid.

Optionally, the spraying device further comprises a reservoir for containing the fluid. The reservoir is in fluid communication with the inlet of the housing. Such a reservoir provides an easily refillable and/or replaceable source of fluid for the spraying device. This contributes to ease of use, as the reservoir and housing combine into a compact spraying device which does not require additional external fluid sources connected for operation.

Optionally, the housing comprises a mounting portion for the reservoir. The mounting portion can contribute to the ease of use, allowing for a reservoir to be easily secured to the housing and having features to ensure proper orientation of reservoir and housing.

Optionally, the drive system comprises a gear train configured to move the retractable nozzle and the nozzle cover; a motor for driving the gear train; and a power supply for powering the motor.

Optionally, the gear train is configured to operate the pump to send pressurized fluid to the nozzle when the nozzle is in the spraying position.

Optionally, the spraying device further comprises a control system to control the drive system. Optionally, the control system comprises one or more sensors which signals when to move the cover and retractable nozzle into a spraying position and to operate the pump. Further optionally, the one or more sensors comprises an accelerometer or a tilt switch.

Such a control system allows the spraying device to be able to function automatically without the need for a user to manually trigger the start of a spraying operation. One or more sensors can indicate to the control system that a spraying operation is needed. For example, if the spraying device is on a rotatable surface, like e.g. a rotatable lid, like e.g. a toilet lid, a sensor such as an accelerometer can detect the motion and/or orientation of the toilet lid being shut. Upon detection of this, the accelerometer can send a signal to the control system to begin a spraying operation. The control system can then send a signal to the drive system to operate the pump, move the cover to an open position and extend the nozzle into a spraying position. When the fluid is discharged through the nozzle, the control system can then signal to the drive system to retract the nozzle, move the cover to a closed position and power down the pump. The spraying device can then be in a stand-by or rest mode, and await another triggering event. The control system can monitor and control all these operations and/or send signals for the actuations and movements simultaneously, and it does not have to be in the order set out. For example, the control system could control the operation as one cycle consisting of opening the cover, extending the nozzle, spraying, retracting the nozzle and closing the cover. The control system can also monitor other conditions, such as battery life, intermediate movements and other conditions to ensure system is working properly and prevent dangerous situations.

Optionally, the nozzle cover slides between the open position and the closed position. Further optionally, this movement is done using a scotch yoke mechanism and is driven by the drive system.

Optionally, the nozzle cover comprises a face portion which covers the nozzle in the closed position and moves to allow the nozzle to extend in the open position; first and second rails connected to the face portion; and a slot for receiving a pin which moves the cover along the first and second tracks. The first and second rails are positioned to slide along first and second tracks in the device to guide the movement of the cover.

Optionally, the nozzle cover further comprises a first slot on the first rail to receive a first projection connected to the nozzle; and a second slot on the second rail to receive a second projection connected to the nozzle. The first slot and the second slot are shaped so that the nozzle moves into the spraying position as cover moves into the open position and so that the nozzle moves into the retracted position when cover moves into the closed position. Optionally, the first projection and the second projection can include a broad portion and a smaller portion. The broad portion can be for steadying the nozzle and keeping it properly positioned, and the smaller portion can be the portion which is received by the slot. Optionally, the smaller portion can be cylindrical which can enable easy sliding movement.

Optionally, one of the nozzle cover and the nozzle are configured to be driven by the drive system. The other of the nozzle cover and the nozzle are configured to be driven by the movement of the one driven by the drive system. This can mean that the nozzle cover is driven by the drive system and the nozzle is configured to be driven by the movement of the nozzle cover. Conversely, the nozzle could be driven by the drive system and the nozzle cover could be configured to be driven by the movement of the nozzle.

Such systems which connects the movement of the nozzle and nozzle cover, having only one driven by the drive system can make for a more reliable system and ensure that the nozzle cover and nozzle move simultaneously. Additionally, configuring the nozzle and nozzle cover so that only one is driven by the drive system and the other is driven by the movement of the first one can result in a overall more compact system.

Optionally, the spraying device further comprises a mounting system for connecting the back side of the housing to a surface. A mounting system can enable easy and secure attachment of the spraying device to another surface.

Optionally, the mounting system comprises a mounting plate with a first side for connecting to a surface and a second side for connecting to the housing of the spraying device; and one or more guides to guide and/or secure the housing to the mounting plate. Further optionally, the mounting system further comprises a locking feature to secure the housing to the mounting plate. Such a mounting system could be designed to ensure spraying device is properly oriented for operation when connected to the mounting plate.

Optionally, the spraying device further comprises a safety switch for disabling the spraying device when the housing is not secured to the mounting plate. This can ensure that the spraying device does not perform a spraying operation when not desired, preventing accidental trigger of a spraying operation.

Optionally, the spraying device is a toilet spraying device for mounting to a lid of a toilet.

According to a second aspect of the invention, a method of spraying a fluid from a spraying device comprises (a) securing the spraying device to a surface using a mounting system; (b) moving a nozzle cover to an open position and extending a nozzle to a spraying position with a drive system; (c) operating a pump with the drive system to supply pressurized fluid to the nozzle; (d) directing the fluid toward a desired spraying area; and (e) retracting the nozzle to a rest position and moving the nozzle cover to a closed position. Optionally, the device used to perform the method can be the spraying device as disclosed above.

The movement of the nozzle cover and extending or retracting the nozzle can be done simultaneously or partially simultaneously in some embodiments. This could ensure that the spraying operation is both efficient and that the movements of the nozzle and nozzle cover do not negatively affect the other. For example, by at least partially simultaneously moving nozzle cover to an open position and extending nozzle to a spraying position, the nozzle does not attempt to extend to a spraying position while cover is still in a closed position. If the nozzle did attempt to extend to a spraying position while the cover was in a closed position, the nozzle would be blocked from this movement, which could result in other system failures, for example, in the drive system.

Optionally, the method further comprises using one or more sensors to detect an event triggering a spraying operation; and sending a signal from the one or more sensors to a control system to perform steps (b)-(e).

DETAILED DESCRIPTION

Figure 1A:
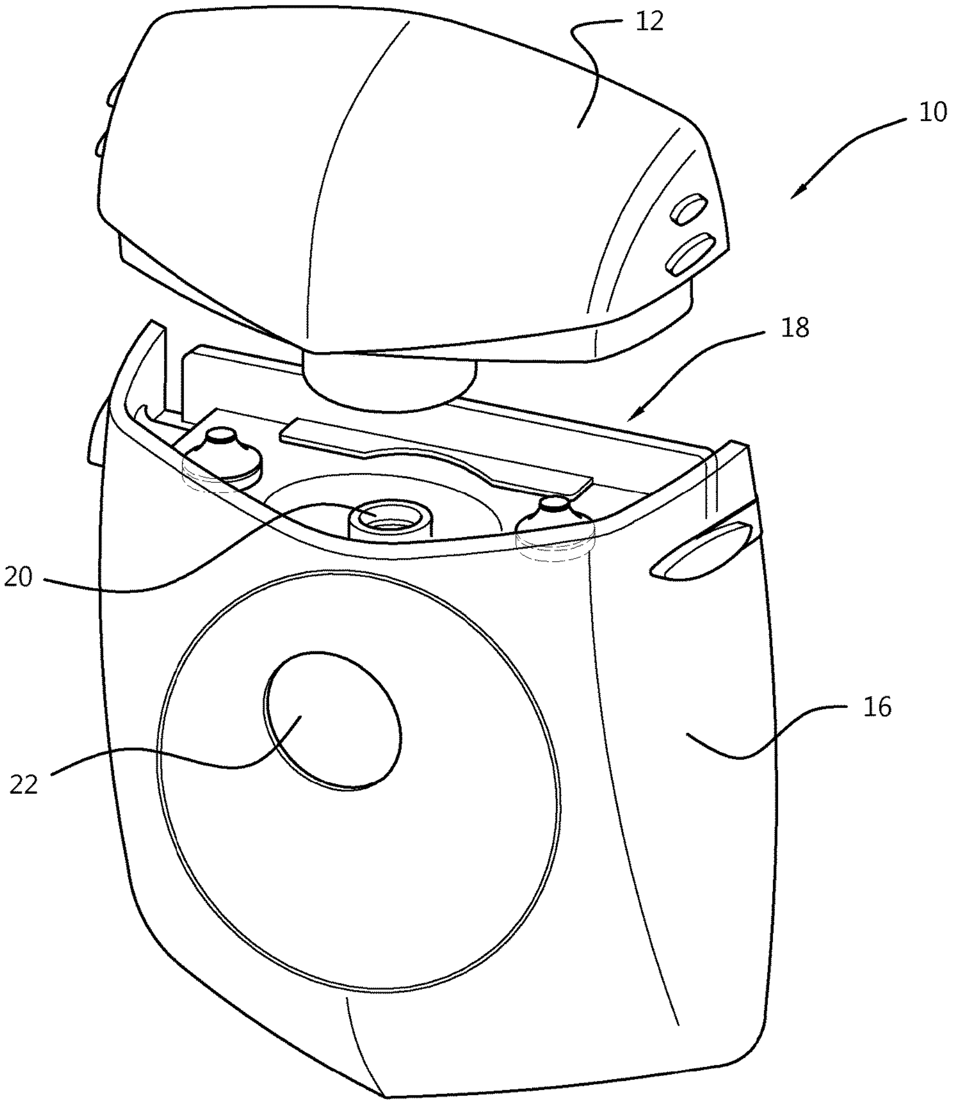
FIG. 1*a* illustrates a perspective view of a spraying device with a reservoir not yet attached.
Figure 1B:
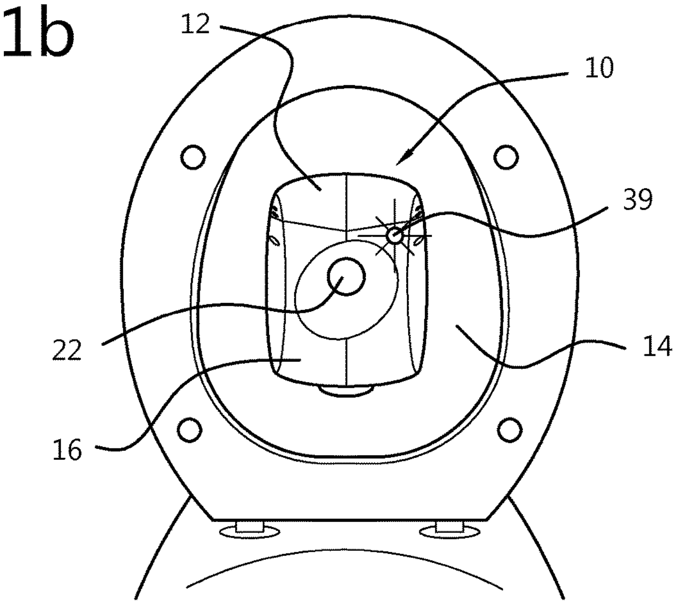
FIG. 1*b* illustrates a perspective view of the spraying device of FIG. 1*a* connected to a toilet lid.
Figure 1C:
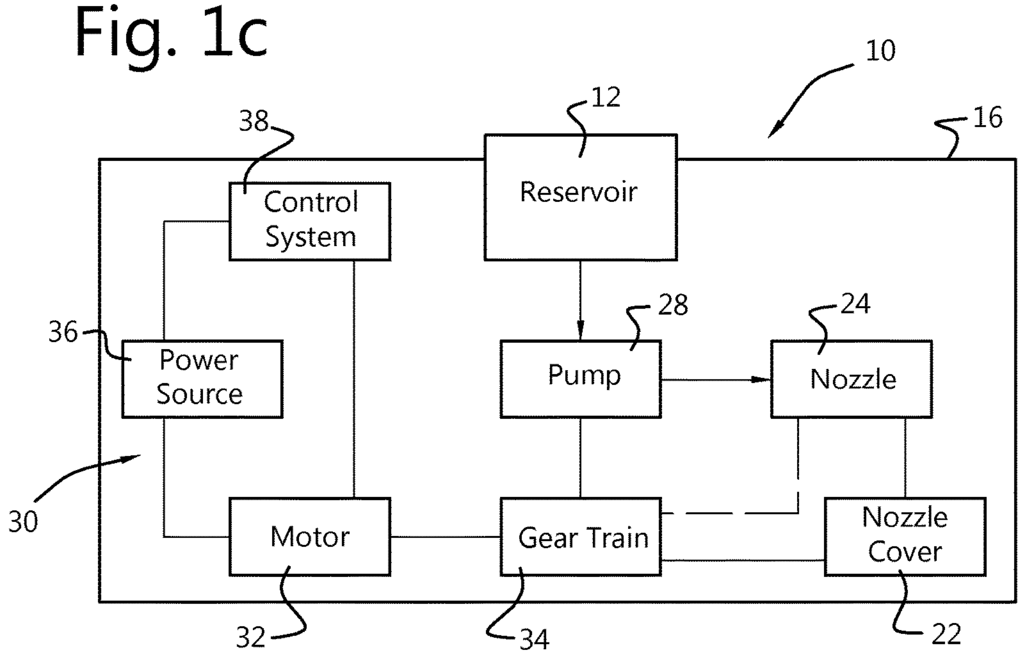
FIG. 1*c* shows a schematic illustration of the spraying device of FIG. 1*a*.

FIG. 1*a* illustrates a perspective view of spraying device 10 with reservoir 12 not yet attached, FIG. 1*b* illustrates a perspective view of spraying device 10 connected to a toilet lid 14, and FIG. 1*c* shows a schematic illustration of spraying device 10.

Spraying device 10 includes reservoir 12, housing 16, reservoir mount 18, inlet 20, nozzle cover 22, nozzle 24, pump 28; drive system 30 with motor 32, gear train 34 and power source 36; and control system 38 with light 39. Spraying device 10 can also include various fluid lines, connection parts, power lines and other components not shown for simplicity purposes.

Housing 16 forms an outer shell around spraying device 10 and includes reservoir mount 18 for receiving and/or securing reservoir 12. Reservoir mount 18 can be shaped complementary to reservoir 12 and/or can include securing features and/or safety features, for example, a mechanical locking feature with a quick release and/or a safety switch so that spraying device 10 cannot perform a spraying operation unless a safety switch is activated by the securing of a reservoir to reservoir mount 18. Inlet 20 can include a seal, for example, an o-ring, to ensure a tight connection between reservoir 12 and housing 16, thereby preventing leaks when fluid goes from reservoir 12 into inlet 20.

Nozzle cover 22 is connected to housing 16, and forms a cover over nozzle 24 when nozzle is in a retracted position inside of housing 16. Nozzle cover 22 can move between a closed position where cover 22 covers nozzle and an open position where cover 22 allows nozzle 24 to extend to a spraying position. Nozzle cover 22 can move from these positions with, for example, a sliding movement or another type of movement.

Figure 2A:
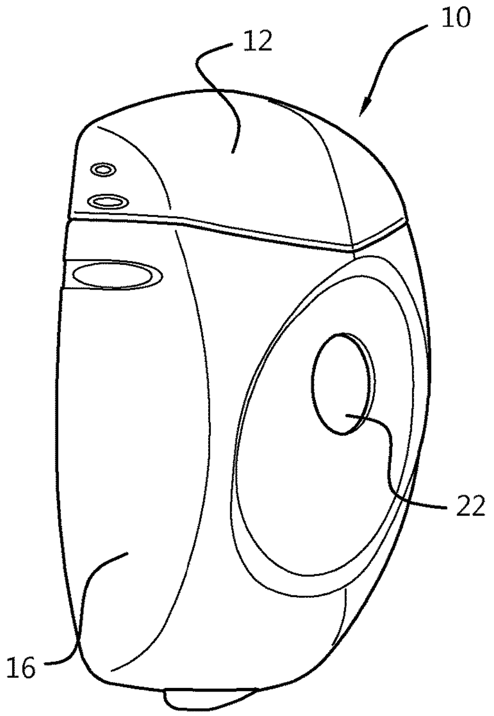
FIG. 2*a* shows perspective view of a spraying device with a nozzle in a retracted position and a cover closed.
Figure 2B:
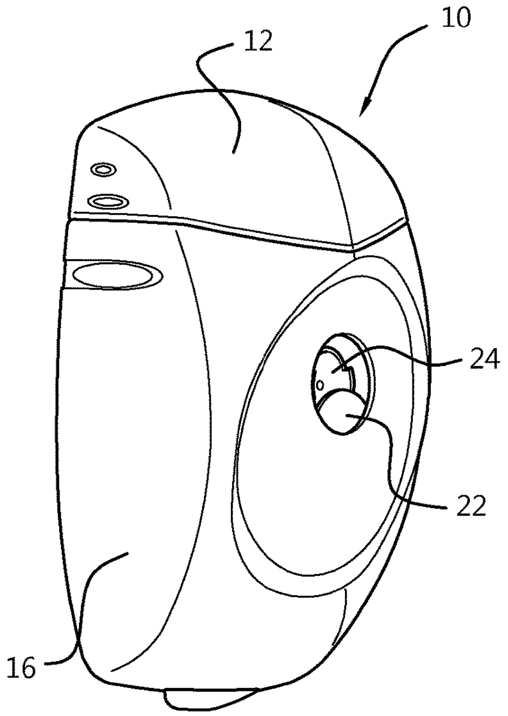
FIG. 2*b* shows a perspective view of the spraying device of FIG. 2*a* with the nozzle partially extended and the cover partially open.
Figure 2C:
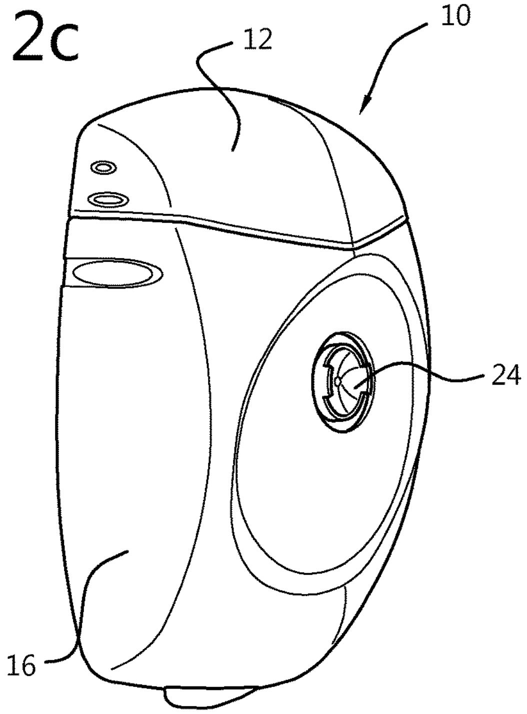
FIG. 2*c* shows a perspective view of the spraying device of FIG. 2*a* with the nozzle extended into a spraying position and the cover in an open position.

Nozzle 24 can move from a retracted position within housing 16 (FIG. 1*a*) to a spraying position (see FIG. 2*c*). Nozzle 24 can be, for example, a vortex nozzle, in which the incoming fluid flow would be split into separate fluid streams which flow tangentially into a swirl chamber, so as to create a fluid vortex just prior to discharge through the nozzle 24. The swirling sheet of fluid accelerates through a discharge orifice of the nozzle, breaking first into fluid ligaments and then into droplets via shear, pressure gradients, and aerodynamic drag. The specific geometry used can affect the fluid parameters and shape as the fluid exits nozzle 24 of spray device 10, and can be used to atomize the fluid if desired.

Pump 28 is in fluid communication with reservoir 12 through inlet 20 and with nozzle 24. Pump 28 can be any suitable pump, for example, a positive displacement pump. In other embodiments, pump could be any other pneumatically or electrically operation pump, including but not limited to a gear pump, an impeller pump, a rotary pump, a piston pump, a screw pump, a peristaltic pump and a diaphragm pump. Pump 28 works to draw fluid from reservoir 12, pressurize the fluid and deliver the fluid to nozzle 24.

Drive system 30 works to operate pump 28, and to move nozzle cover 22 and nozzle 24. Power source 36 provides power to motor 32, and can include one or more batteries, photovoltaic cells or panels, capacitors or any other power source or combination of power sources. Motor 32 is connected to gear train 34 and drives gear train 34, which operates pump 28, and moves nozzle cover 22 and nozzle 24. Motor 32 can be, for example, an electric motor.

Control system 38 controls spraying device 10, and can include one or more sensors to detect motion, orientation or another event to trigger a spraying operation. For example, in a spraying device 10 in use with a toilet, control system 38 could include an accelerometer to detect motion and/or orientation of spray device 10 which would indicate that the toilet lid 14 was being shut. Shutting of the toilet lid could be a triggering event for a spraying operation, causing control system 38 to activate drive system 30. Control system 38 can additionally detect when a spraying operation should not take place and prevent any activation of a spraying operation during certain conditions, for example when a toilet lid is in an upright position. Control system 38 can also include a timer for controlling any delay in starting a spraying operation as well as the duration of a spraying operation. Control system 38 may further include an indicator 39 to provide a visual or audible indication that system is going to start or is in the middle of a spraying cycle. This could be, for example, in the form of a light 39 visible from outside the housing 16 as shown in FIG. 1*b*. Power source 36 can also provide power to control system 38 and any sensors, indicators and/or devices which interact with control system 38 and/or form a part of control system.

In operation, spraying device 10 can connect to another surface, for example toilet lid 14 as shown in FIG. 1*b*. This connection is described in more detail in relation to FIGS. 4*a*-4*b*. Reservoir 12 is secured into mount 18 to provide fluid for spraying device 10. When toilet lid 14 is closed, control system 38 detects this motion and determines that spraying device 10 should activate to perform a spraying operation. Control system 38 can delay actuation of spraying device 10 for a period of time if desired, for example 10 seconds, to allow a toilet to flush. Control unit 38 can then send a signal to motor 32 to drive gear train 34. Motor 32 activates and drives gear train 34 to simultaneously operate pump 28 and move nozzle cover 22 and nozzle 24.

Gear train 34 moves nozzle cover 22 to an open position and moves nozzle 24 into a spraying position. This can be facilitated by moving each of nozzle cover 22 and nozzle 24 directly, or moving only one of nozzle 24 and cover 22 directly from gear train 34 and then coupling the other to the one being directly driven. At the same time, gear train 34 operates pump 28 to draw a desired amount of fluid from reservoir 12, pressurize the fluid and sending it to nozzle 24. Nozzle 24 (in the spraying position) receives this fluid from pump 28 and directs the pressurized fluid to the desired cleaning area. After the desired amount of fluid has exited nozzle 24, drive system 30 operates to simultaneously retract nozzle 24 and close nozzle cover 22. Control system 38 then signals that motor 32 can power down, and device 10 can remain in a rest or stand-by mode until detection of another event triggering a spraying operation.

By forming a drive system 30 which can simultaneously operate a pump and move nozzle cover 22 and nozzle 24 to an open and spraying position, spraying device 10 can provide a compact and reliable system for automatic spraying of a fluid. Spraying device 10 allows for a wide spray of fluid without clipping housing 16 by extending nozzle 24 to a spraying position and prevents any residual dripping by retracting and covering nozzle 24 with cover 22 when in a resting or stand-by position. The use of reservoir 12, power source 36 and control system 38 within spraying device 10 allows for a compact system that can automatically spray a fluid at a directed area without the need for outside fluid or power sources. A user of the area that is desired for the spray, for example, a person using the toilet, does not have to manually activate spraying device 10. Instead, control system 38 can determine when activation is needed and signals to drive system 30 to perform a spraying operation.

Nozzle 24 being able to extend outside of housing 16 allows for a wider spray area than nozzles which spray from an inside of housing 16. This can be especially useful when used to clean toilet bowls, as an even spray can be spread over the whole inner volume of the toilet bowl for effective cleaning of the entire toilet bowl. Nozzle cover 22 being able to open and close can ensure that nozzle 24 is covered when not in use and therefore no unintended contact between fluid and a user or other surface is made. This is especially important when particular cleaning chemicals, such as bleach, are used. Cover 22 can prevent any residual cleaning fluid left on nozzle 24 from coming into contact with a surface that it could damage, for example, the clothing or skin of a user of a toilet.

FIG. 2*a* shows perspective view of spraying device 10 with nozzle 24 in a retracted position and a cover 22 in a closed position, FIG. 2*b* shows nozzle 24 partially extended and cover 22 partially open, and FIG. 2*c* shows nozzle 24 extended into a spraying position and cover 22 in a fully open position.

As discussed in relation to FIGS. 1*a*-1*c*, during a spraying operation, cover 22 retracts to allow nozzle 24 to extend to a spraying position. Cover 22 can move in a sliding direction inside of housing 16. In other embodiments, cover 22 could move in a different manner and/or could be located on an outside of housing 16.

At the same time that cover 22 moves, nozzle 24 moves to extend into a spraying position (FIG. 2*c*). The movement of nozzle 24 can be minimal, for example, about 4 mm from a retracted position to a spraying position. Once the spraying is finished, nozzle 24 retracts back inside of housing 16, and cover 22 slides back to cover nozzle 24, as shown in FIG. 2*a*.

Cover 22 and nozzle 24 move simultaneously into a spraying position with cover 22 retracted (FIG. 2*c*), and back to a rest position with nozzle 24 retracted and cover 22 covering nozzle 24. Drive system 30 and control system 38 facilitate this simultaneous movement, ensuring that an efficient and automatic spraying operation can take place with minimal moving parts.

Figure 3B:
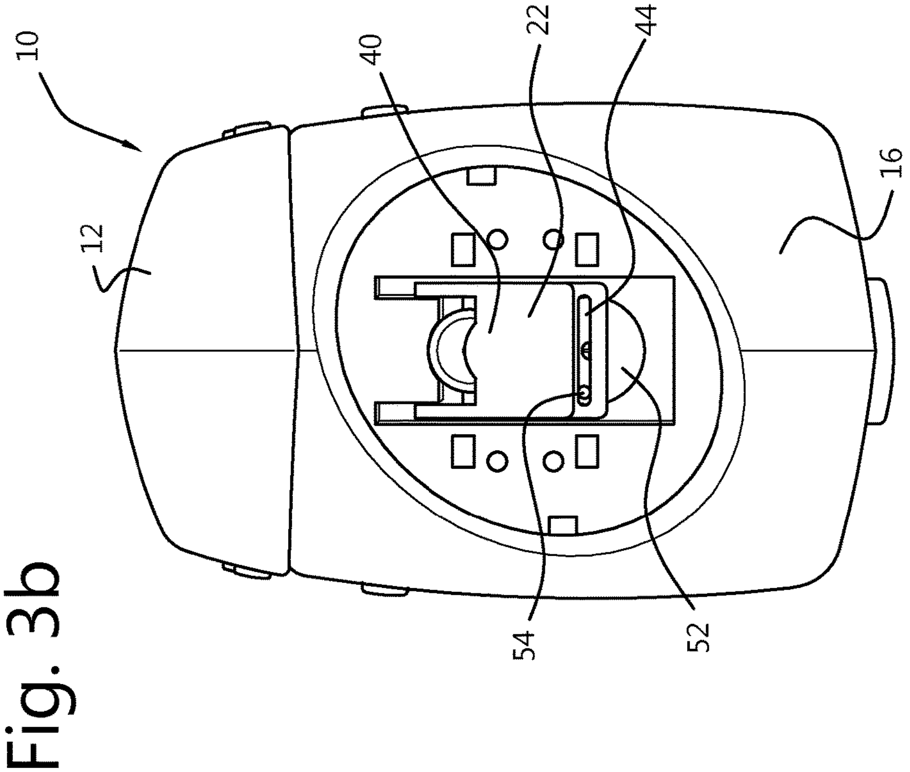
FIG. 3*b* shows a front view of the spraying device of FIG. 3*a* with the nozzle partially extended and the cover partially open.
Figure 3A:
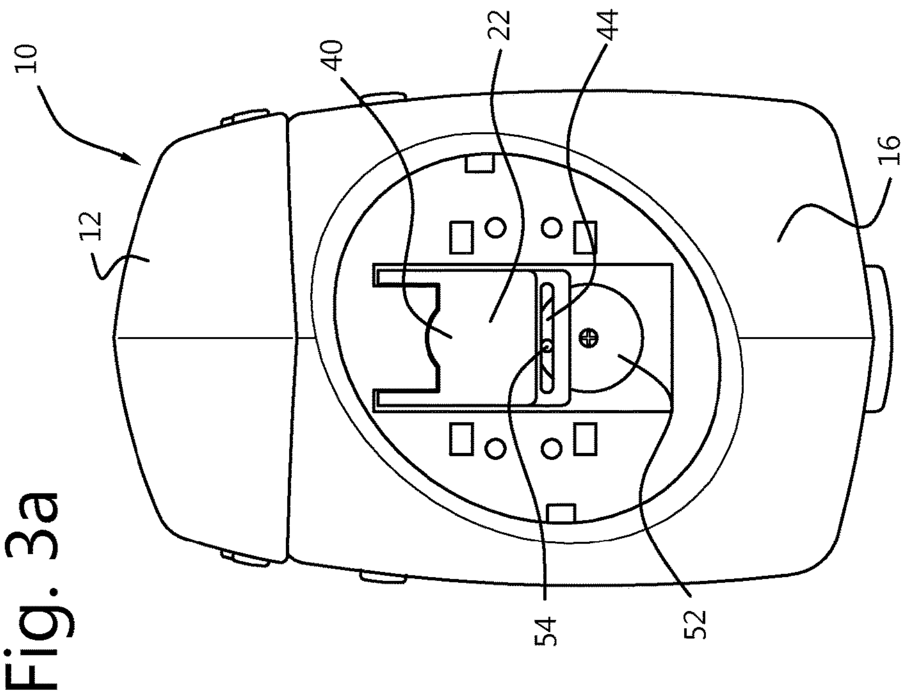
FIG. 3*a* shows front view of a spraying device with a nozzle in a retracted position and a cover closed, the spraying device with a portion of the housing removed for viewing purposes.
Figure 3D:
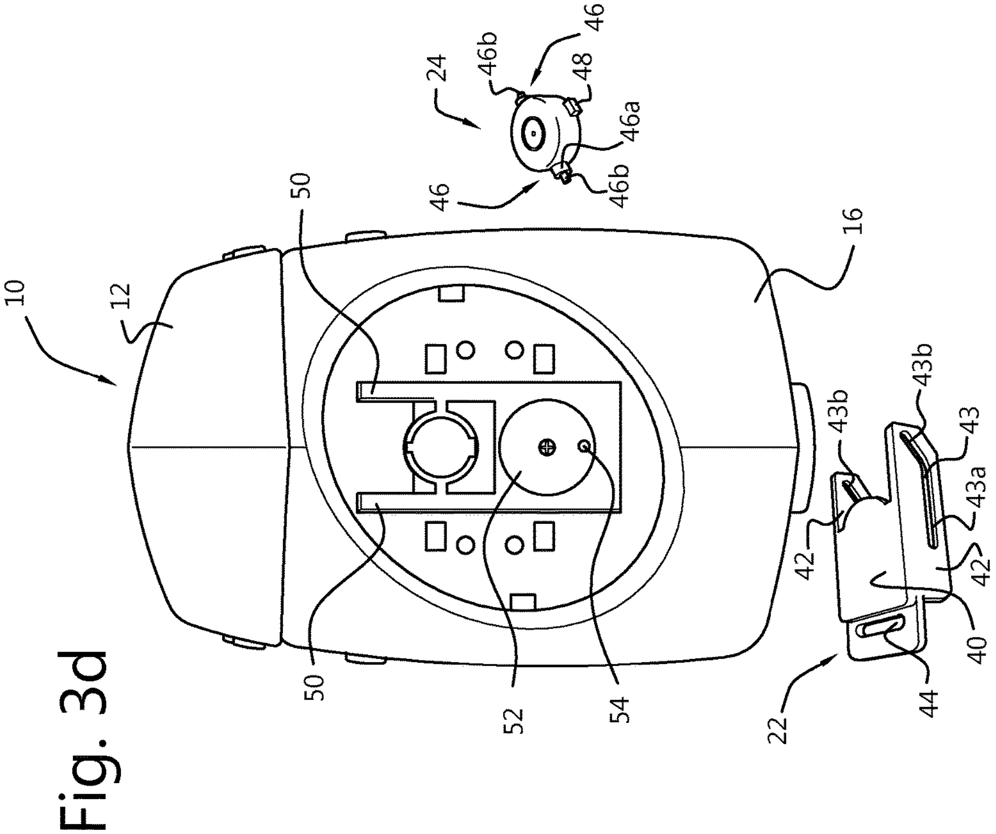
FIG. 3*d* shows an exploded view of the cover, nozzle and a front of the housing of FIG. 3*a*.
Figure 3C:
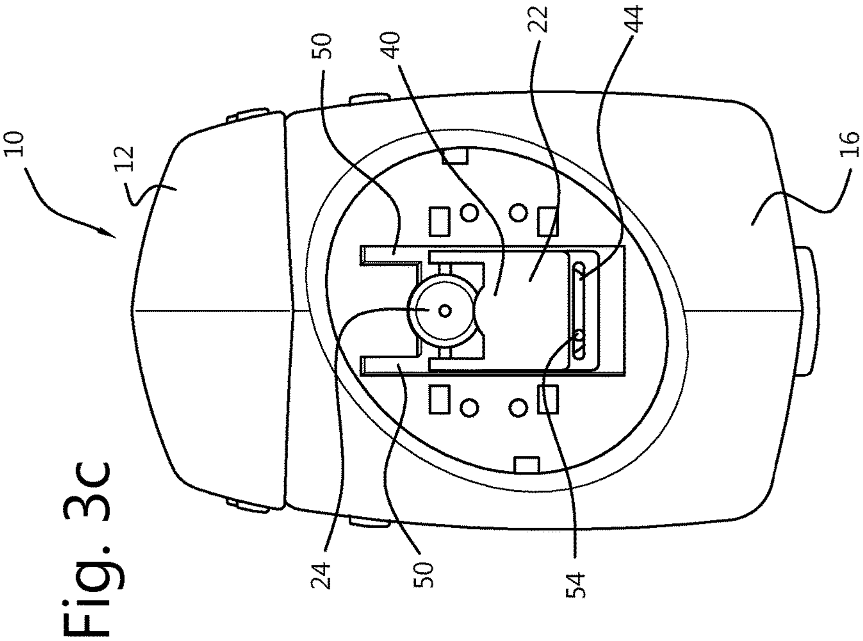
FIG. 3*c* shows a front view of the spraying device of FIG. 3*a* with the nozzle extended into a spraying position and the cover in an open position.

FIGS. 3*a*-3*c* show a front views of the cover 22 and nozzle 24 performing the same movements as in FIGS. 2*a*-2*c*, with a part of housing 16 removed for viewing purposes. FIG. 3*d* shows an exploded perspective view of cover 22, nozzle 24 and a front of device 10 where cover 22 and nozzle 24 sit.

FIGS. 3*a*-3*c* include reservoir 12, housing 16, cover 22 with face portion 40, first and second rails 42 with first and second slots 43 (with distal portion 43*a* and angled portion 43*b*) and slot 44; nozzle 24 with first and second projections 46 and pin 48; first and second tracks 50, and cam 52 with pin 54.

Each of first and second projections 46 of nozzle 24 include a broad portion 46*a* which is flat shaped and a smaller portion 46*b*. In the embodiment shown, broad portion 46*a* is flat and rectangular shaped, and smaller portion 46*b* is cylindrical in shape.

First and second tracks 50 are formed in housing 16, though in other embodiments first and second tracks 50 could be formed from another part of spraying device 10. First and second tracks 50 guide the sliding movement of cover 22 between the closed position (FIG. 3*a*) and the open position (FIG. 3*c*).

Cover 22 includes slot 44 for receiving pin 54 on cam 52. First and second rails 42 extend substantially perpendicularly from face portion 40 on sides of face portion 40 of cover 22, and act to guide the movement of cover 22 to and from the open and closed positions. In this embodiment, cover 22 moves in a sliding direction, with cover 22 in a closed position and face portion 40 covering nozzle 24 when cover is at an position closest to reservoir 12. To move to an open position, cover 22 moves slidingly along first and second tracks 50 to an open position where face portion 40 no longer covers nozzle 24 and cover 22 is at a position furthest from reservoir 12 (along tracks 50). At this open position, cover 22 is situated to allow nozzle 24 to extend forward into a spraying position.

First and second slots 43 on first and second rails 42 of cover 22 are for receiving smaller portions 46*b* of first and second projections 46 of nozzle 24. Pin 48 and broad portions 46*a* of projections 46 fit into slots in housing 16 to ensure that nozzle 24 stays properly positioned and does not rotate. Pin 48 and broad portions 46*a* of projections 46 also help to ensure cylindrical portions of projections 46*b* stay within slots 43. The geometry around where nozzle 24 fits into housing 16 and/or device 10 can also work to ensure that nozzle 24 stays in proper position and alignment for extending and retracting. First and second slots 43 are shaped to facilitate the movement of nozzle 24 from the retracted position to the spraying position and back. Thus, in this embodiment, slots 43 extend at a distal portion 43*a* of each of rails 42 for most of the length of slots 43. When cylindrical portions 46*b* of projections 46 are in these distal portions 43*a* of slots 43, nozzle 24 sits back within housing in a retracted position. At an end of rails 42, slots 43 have an angled portion 43*b*, moving to a more forward position on each of rails 42. Thus, when cylindrical portions 46*b* of projections 46 are located in these angled portions 43*a* of slots 43, nozzle 24 extends forward relative to cover 22 and housing 16, placing nozzle 24 into a spraying position (FIG. 3*c*).

The movement of cover 22 is facilitated by a Scotch yoke mechanism, where cam 52 with pin 54 is rotated by drive system 30 (not shown in FIGS. 3*a*-3*d*). Pin 54 engages slot 44 on cover 22. The rotational movement of cam 52 is translated into sliding linear movement of cover 22 through pin 54 in slot 44. As cam 52 rotates, pin 54 rotates therewith causing cover 22 to move linearly along first and second tracks 50 with the movement of pin 54.

Nozzle 24 is held stationary relative to linear movement of cover 22 by the shape of housing 16, as well as broad portions 46*a* of projections 46. Thus, as cover 22 is moved into an open position, small portions 46*b* of projections 46 of nozzle 24 slide along distal portions 43*a* of slots 43 in rails 42. When cover 22 has moved to a certain point, small portions 46*b* of projections 46 enter the angled portion 43*b*, moving nozzle 24 into a spraying position. When a spraying operation is done, cam 52 rotates, and cover 22 is moved back to a closed position. Small portions 46*b* of projections 46 are then moved back into distal portions 43*a* of slots 43 by movement of cover 22, thus retracting nozzle 24 into the retracted position.

By connecting movement systems for cover 22 and nozzle 24, drive system 30 can simultaneously move cover 22 and nozzle with minimal parts. Connecting the movements of cover 22 and nozzle 24 through the use of rails 42 with slots 43 in cover 22 and projections 46 on nozzle 24, ensures that cover 22 and nozzle 24 move simultaneously from the closed and retracted position to an open and extended position and vice versa. Thus, this eliminates any situation in which one movement system improperly functions but the other movement system is operational. For example, if nozzle 24 movement system malfunctioned and nozzle was stuck in a spraying position, but cover 22 was moving into a closed position as its movement system was still functional. In that situation, cover 22 would be at least partially blocked by nozzle 24 from closing, which could result in other failures within spraying device 10. The coupling of movement systems for cover 22 and nozzle 24 in spraying device 10 decreases the parts necessary for each of the movements, ensures simultaneous movement and thereby contributes to a more reliable, simpler, less error-prone and compact system. Additionally, as the movement of nozzle 24 is controlled by the movement of cover 22, drive system 30 only needs to connect to and drive the movement of cover 22. The cylindrical shape of small portions 46*b* of projections can help to facilitate easy sliding movement through slots 43, and broad portions 46*a* can help stabilize and properly position nozzle 24.

Figure 4B:
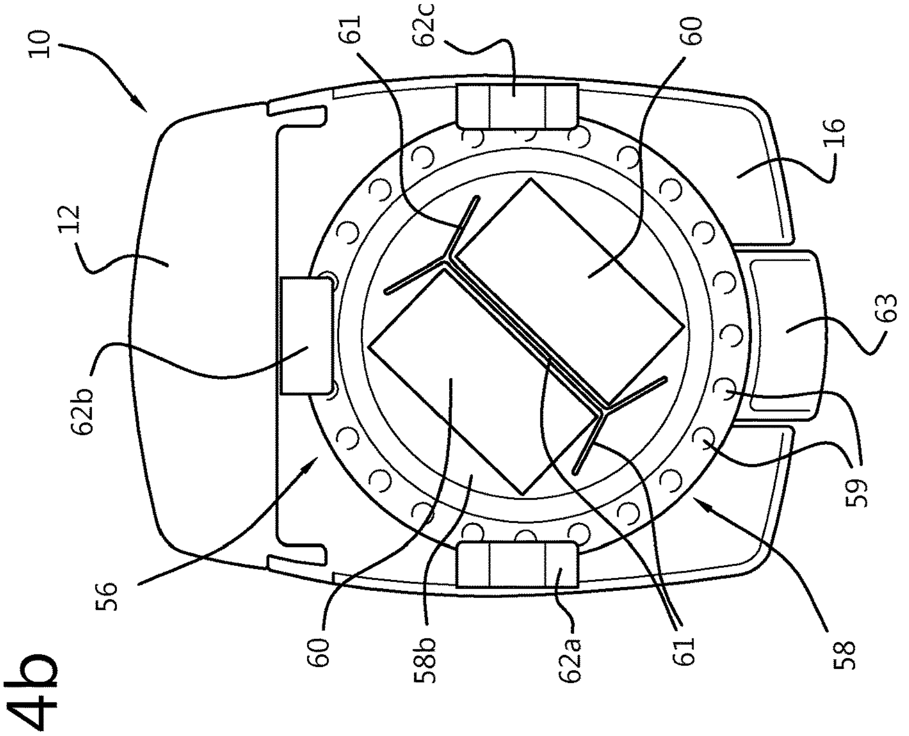
FIG. 4*b* shows a perspective back view of the spraying device housing secured to the mounting plate.
Figure 4A:
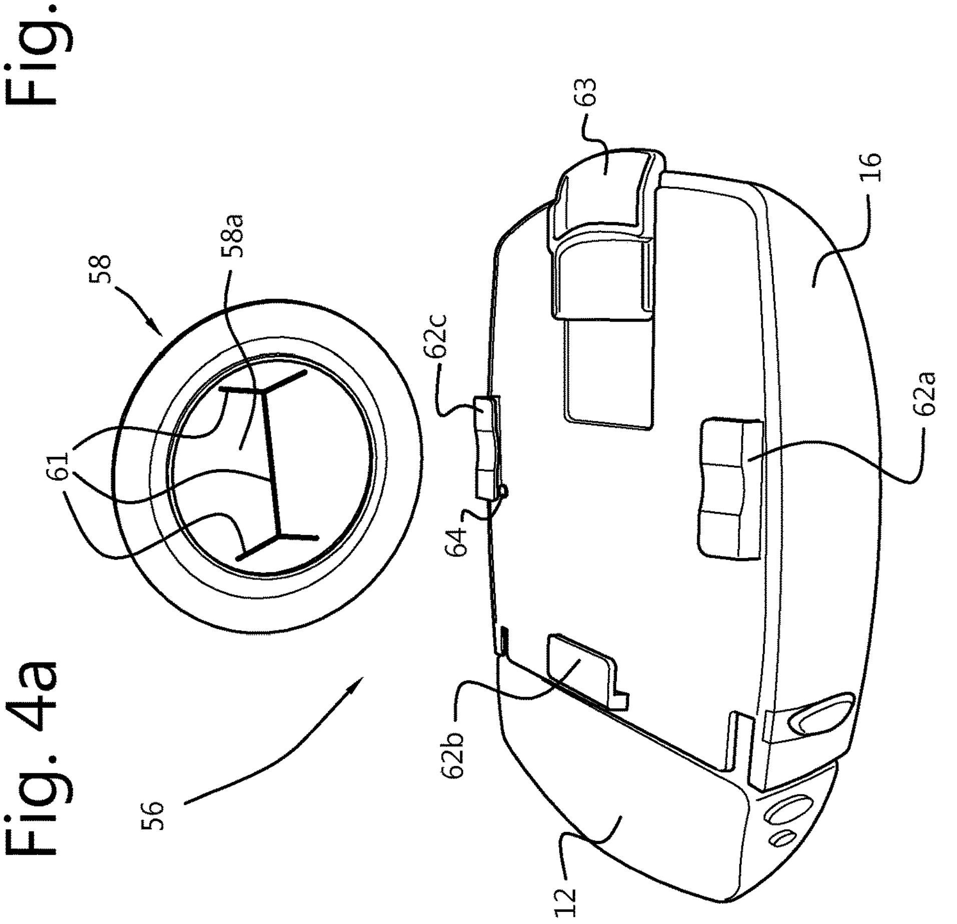
FIG. 4*a* shows a perspective view of the mounting system of a spraying device with the spraying device housing not yet connected to a mounting plate.

FIG. 4*a* shows a perspective view of mounting system 56 of spraying device 10, with spraying device 10 not mounted to mounting plate 58, and FIG. 4*b* shows a back view of spraying device 10 mounted to mounting plate 58. Mounting system 56 includes mounting plate 58 (with first side 58*a* and second side 58*b*, grooves 59 and slits 61), adhesive material 60, guides 62*a*, 62*b*, 62*c*, lock 63 and safety switch 64.

Mounting plate 58 is circular, but can be shaped differently in other embodiments. Mounting plate 58 includes first side 58*a* which contacts another surface, for example a toilet lid (see FIG. 1*b*), and second side 58*b* which contacts a backside of housing 16. Adhesive material 60 can be used on first side 58*a* to secure mounting plate 58 to another surface. Mounting plate 58 is also designed with slits 61 which allow mounting plate 58 flexibility to secure to a surface that is not flat, for example a surface with inner curvature. The circular shape of mounting plate 58 allows for the user to not have to be concerned with securing mounting plate 58 at a particular orientation as it can be fixed in any direction without compromising functionality of mounting system 56 and spraying device 10. Other embodiments could have other systems for securing mounting plate 58, for example, a hook and loop fastener system, a bolt, clamp, hook, screw, bayonet fitting or other type of securing means for connecting mounting plate 58 to another surface.

Guides 62*a*, 62*b*, 62*c* and lock 63 are connected to housing 16 of spraying device 10, with guides 62*a* and 62*c* forming side guides and guide 62*b* forming a top guide. Guides 62*a*, 62*b* and 62*c* are typically rigid materials, and lock 63 can be a flexible part of housing 16 which has an outer complementary shape to mounting plate 58. In other embodiments, guides 62*a*, 62*b*, 62*c* and/or lock 63 can have a different shape and/or structure to secure to mounting plate 58.

Mounting plate 58 is shaped complementary to guides 62*a*, 62*b*, 62*c* and lock 63 so that guides 62*a*, 62*b*, 62*c* assist the movement of spraying device 10 housing 16 onto mounting plate 58 at a proper orientation for spraying device 10. Guides 62*a*, 62*b*, 62*c* and lock 63 secure spraying device 10 to mounting plate 58. Additionally, grooves 59 can be shaped complementary to projections (not shown) on an inner side of guides 62*a*, 62*b*, 62*c* to further secure spraying device 10 to mounting plate 58 and resist relative movement between the two, for example rotational movement.

In this embodiment, three guides 62*a*, 62*b*, 62*c* are used, and lock 63 flexes toward a front of housing 16 to allow spraying device 10 to slide onto mounting plate 58 with guides 62*a*, 62*c* limiting side movement. Spraying device 10 is secured to mounting plate 58 when a top part of mounting plate 58 is engaged by top guide 62*b*, and lock 63 flexes to snap back out and secure the spraying device 10 to mounting plate 58.

Safety switch 64 is located on housing 16 underneath guide 62*c*. In other embodiments, safety switch 64 could be located in other places. Safety switch is shaped and located to be activated only when spraying device 10 is mounted to mounting plate 58. Safety switch 64 sends a signal to control unit 38 that a spraying operation can occur only when spraying device 10 is mounted to mounting plate 58. If spraying device 10 is not mounted to mounting plate 58, safety switch 64 is not activated, and the control unit 38 will not being a spraying operation.

Mounting system 56 with safety switch 64, provides for a safe and secure mounting system for spraying device 10. Mounting system 56 ensures that when a user secures housing 16 to mounting plate 58, spraying device 10 is positioned and oriented for functional use. Mounting system 56 also allows for easy detachment of housing 16 and mounting plate 58, for example, to quickly replace batteries for spraying device 10. By including safety switch 64, mounting system 56 prevents unintended spraying operations when housing 16 is not mounted to mounting plate 58. Additionally, by locating safety switch 64 in an area underneath guide 62*c*, guide 62*c* can help to protect safety switch 64 from an accidental activation by something other than mounting plate 58, thereby preventing an unintended spraying operation from such accidental activation.

In summary, spraying device 10 provides for a compact and reliable automatic system which can spray a fluid at a wide angle during a spraying operation and ensure that no fluid leaks or drips out when in a resting state. Extendable and retractable nozzle 24 allows for a wider range of spray than nozzles which remain stationary inside a housing. Cover 22 keeps any residual fluid left on nozzle from leaking outside of housing 16 when spraying device 10 is in a resting state, thereby protecting anything and anyone that may come into contact with housing 16 and protecting nozzle 24 when in a rest position. Control system 38 can automatically detect when a spraying operation is desired, and initiate that spraying operation. Drive system 30 which can simultaneously operate pump while moving nozzle 24 and cover 22 allows for a simple and compact device with fewer parts and efficient driving of moving parts, thereby eliminating situations in which one movement system malfunctions (in a device with multiple movement systems) thereby rendering the entire device ineffective. Additionally, if movement systems for cover 22 and nozzle 24 are coupled as shown in FIGS. 3*a*-3*d*, drive system 30 can simultaneously move cover 22 and nozzle 24 with even fewer parts, thereby ensuring the simultaneous movement of cover 22 and nozzle 24 and a compact design for optimal spraying operations. The compactness of spraying device and ability to connect to another surface allow for ease of use of spraying device, particularly with other standard devices, for example a toilet. Spraying device 10 is compact enough to connect to a standard toilet lid, and generally not interfere with or bother a user of the toilet. The use of a moveable cover 22 and nozzle 24 also results in a safe system, keeping residual spraying fluid from coming into contact with a user or another surface which could be damaged.

Mounting system 56 provides for a flexible mounting of spraying device 10 to a variety of different surfaces, thereby enabling easy use of compact spraying device 10 in many different desired areas including with standard objects and other devices. The snap fit mechanism provides for a secure connection to mounting plate 58, and the design of mounting system 56 ensures that spraying device 10 is properly aligned and oriented for a spraying operation when secured to mounting plate 58. Additionally, the safety switch ensures that spraying device 10 does not perform a spraying operation when not secured to mounting plate 58.

While spraying device 10 has been discussed and shown in relation to use with a toilet, spraying device 10 could be used to spray a fluid in other areas, for example, a shower, a bath, a bin, a wheelie bin or any other area desired.

In some embodiments of the device of the invention may be further enhanced by combining the above features with further optional features as explained below.

Thus, the compact spraying device of the invention may optionally also be a device for automatically spraying an enclosure closable by a rotatable lid, wherein the device is attachable to the lid and wherein the device suitably comprises a spraying mechanism suitable for repeatedly spraying individual doses of a cleaning liquid into the interior volume of the enclosure;

an electronic control system which includes a tilt sensor;

wherein the control system is configured to detect the orientation of the device and wherein the control system is optionally programmed to perform the following steps:

a) detecting whether the orientation is such that the tilt angle TA remains at a constant value A1 between a first pair of setpoint angles SA1 and SA2 for at least a preset period of time T1;

b) in case the condition of step a is detected:

starting actuation of the spraying mechanism so as to prime said mechanism, or starting actuation of the spraying mechanism so as to spray an individual dose of cleaning liquid into the interior volume of the enclosure, or starting actuation of the spraying mechanism so as to combine said priming and said spraying;

wherein the actuation of the spraying mechanism is interrupted if the tilt angle TA changes to a value outside a first maximum deviation range MDR1;

c) after the device has been primed or actuated, detecting whether the orientation changes such that the tilt angle TA changes to a second constant value A2 between a second pair of setpoint angles SA3 and SA4 and thereupon remains constant for a preset period of time T2;

d) in case the condition of step c is detected progressing to step e;

e) detecting whether the orientation is such that the tilt angle TA remains at a constant angle A3 between a third pair of angles SA5 and SA6 for at least a preset period of time T3, wherein SA5 equals the value of the angle A1 minus a lower tolerance angle LTA and SA6 equals the value of the angle A1 plus an upper tolerance angle UTA;

f) in case the condition of step e is detected, starting actuation of the spraying mechanism so as to spray an individual dose of cleaning liquid into the interior volume of the enclosure wherein the actuation of the spraying mechanism is interrupted if the tilt angle TA changes to a value outside a second maximum deviation range MDR2;

g) optionally repeating steps c to f;

wherein the tilt angle TA is the angle between a local reference direction fixed in the local reference frame of the device and an external reference direction fixed in the reference frame of the enclosure, such that upon attaching the spraying device to the lid, both the local and the external reference direction lie in the plane of rotation of the lid.

In operation this embodiment of the invention can reliably prevent spraying when the lid of the enclosure is opened and equally reliably ensure that the device is actuated to spray into the enclosure when the lid is closed. Thus, the present device reduces the probability of malfunctioning of the device by failing to detect that the lid is properly closed, even when the response of the device (whether or not to actuate and spray) may be subject to further constraints as will become clear below.

The enclosure may be any enclosed space. Here, the term enclosure is not understood to be limited to hermetically closed spaces as will be evident from this description. Preferably, the device is suitable for dispensing a cleanser of disinfectant composition in a sanitary enclosure. Examples of sanitary enclosures include a toilet room, a toilet bowl, a bathroom, a shower cabinet, a sauna. Alternatively it is preferred that the enclosure is a domestic appliance comprising a cleanable internal space, including a washing machine, a mechanical dish washer, and the like. In yet another preferred embodiment, the enclosure is a container for waste, including for example a dustbin or a wheelie bin. It is particularly preferred that the enclosure is a toilet bowl.

The inner volume of the toilet bowl is defined by the space enclosed by the toilet bowl, the water in the bowl, and the toilet lid when the lid is in the closed (lowered) position. Thus, this volume also includes the space under the rim of the toilet, if such a rim is present. The bottom-side of the toilet lid is the side of the lid that faces the inner side of the toilet bowl when it is in its closed (lowered) position.

The enclosure is preferably equipped with a rotatable lid, wherein the lid typically is a hinged lid or otherwise rotatable around an axis parallel to the primary plane of the lid. Since the enclosure preferably is a toilet bowl, the rotatable surface preferably is a toilet lid.

It is beneficial if actuation of the spraying mechanism of this embodiment of the invention is responsive to the rotary motion of the device that is connected with opening and closing of the lid, since this enables the automated actuation of the device without the need for the user of the enclosure (the toilet) to take any action. Therefore, the actuation of the spraying mechanism is suitably controlled by an electronic control circuit. The control system typically includes a printed circuit board and/or one or more microcontroller units, programmed or programmable to start, interrupt and/or stop actuation of the spraying mechanism in response to stimuli provided by one or more sensors, including a tilt sensor as detailed below.

The electronic control system is preferably suitable for controlling the spray mechanism, but does not have to be limited to that functionality. For example, it can also be capable of actuating a speaker, buzzer or optical signalling means (e.g. an LED), for instance to inform the user that the device is about to be actuated or that the device is running out of cleaner liquid or requires battery replacement.

The electronic control system may suitably also include or be responsive to other switches and/or sensors, for example switches that allow detecting the presence of a liquid cartridge, correct mounting of the device (e.g. by the switch being depressed upon proper mounting), or a sensor/switch to detect the current actuation state of the spraying mechanism.

In order to provide electric power to the control circuit and the actuator, the device can for instance be connectable to an external power source, such as electric mains or an external battery. Preferably, the spraying device is adapted for receiving a removable power source, for example one or more batteries.

The electronic control system suitably includes a tilt sensor and is configured to detect the orientation of the device.

Thus, the electronic control system typically is capable of responding to an electronic read-out of the tilt sensor by starting, interrupting, or stopping actuation of the spraying mechanism.

The orientation of the device—when mounted to the lid of the enclosure (toilet bowl)—is conveniently expressed in terms of its tilt angle. Therefore, in the context of this invention, the tilt angle TA is the angle between a local reference direction fixed in the local reference frame of the device and an external reference direction fixed in the reference frame of the enclosure, such that upon attaching the spraying device to the lid, both the local and the external reference direction lie in the plane of rotation of the lid. If the device of the present invention is mounted to the lid of the enclosure, the orientations that particularly matter are those that correspond to the lid being closed, it being fully opened and orientations in between those two. These orientations are all determined by rotation of the lid within the plane of rotation that is determined by its hinged attachment to the enclosure. In principle, the reference directions that are used (within the plane of rotation) are arbitrary, as long as they are consistently used. For example, when the enclosure is a toilet bowl, the toilet lid rests in a plane that is (approximately) horizontal when it is closed and rotates (approximately) in a vertical plane. In that case, a convenient choice for the external reference direction fixed in the reference frame of the enclosure is the upward vertical direction. A suitable local reference direction fixed in the local reference frame of the device is the direction normal to the base plane of the device, the base plane being a plane that is locally parallel to the toilet lid once the device is closed and the normal direction taken to point from the device in the direction of the lid upon attachment of the device to the lid. A suitable choice for the tilt angle TA is then for it to be the acute angle between these two reference directions. With the above choice of reference directions, a tilt angle TA of 0° (degrees) corresponds to the lid being closed, provided the toilet and the lid are mounted perfectly level. The opening of the lid then corresponds to a positive TA and if the lid is pointing straight up, this corresponds to TA=90° (degrees). Therefore, it is preferred that the external reference direction is the upward vertical direction, the local reference direction is normal to the base plane of the device and pointing from the device towards the lid upon attachment thereto and TA is the acute angle between these directions. In other words, it is preferred that TA is the acute angle between the upward vertical direction and the direction normal to the base plane of the device and pointing from the device to the lid upon attachment thereto.

In the context of this application, a tilt sensor is understood as an electronic sensor that can measure tilting of the device. A tilt sensor typically provides an electronically readable signal that correlates to the tilt angle TA, provided it is correctly placed. There is generally no need for either the sensor or any other part of the electronic control system to calculate TA itself, as it generally suffices to base the logic programmed into the control system on the readable signal rather than on the tilt angle TA, as will be clear to the skilled person.

Suitable tilt sensors are well-known electronic components, including but not limited to: electronic inclinometers, accelerometers, gyroscopes, magnetometers, or sensors based on potentiometers, or variable capacitors. A simple tilt switch, such as for instance a simple mercury switch, is not a suitable tilt sensor in the context of the present invention, because such a simple tilt switch can only switch on or off at one particular tilt angle and is not capable of providing an electronic read out that correlates to the tilt angle TA over the range that is typically accessible when the spraying device is in operation.

Tilt sensors that are based on microelectromechanical systems (MEMS) are preferred. Examples of MEMS-based tilt sensors include accelerometers. It is preferred that the tilt sensor is an accelerometer. Accelerometers can be two-axis or three-axis accelerometers. Though both can be used in the present invention, it is preferred that the tilt sensor is a three axis accelerometer.

Tilt sensors as exemplified above are generally capable of measuring the tilt angle in at least one plane of rotation. Certain tilt sensors, in particular three-axis tilt sensors (e.g. three-axis accelerometers) can provide a signal correlating to rotation in any plane of rotation.

A typical example of a suitable three-axis accelerometer would be the KXTJ2-1009 of Kionix.

The optional electronic control system is suitably configured to detect the orientation of the device. It is important that the tilt sensor—if present—is oriented in such a way in the device and the device is oriented in such a way on the lid of the enclosure that the plane of rotation of the toilet lid results in a sufficient change in the electronic output signal of the tilt sensor, as will be understood by the skilled person. For example, with a two-axis accelerometer as the tilt sensor, optimal precision would be achieved if both axes are in the plane of rotation of the toilet lid.

The optional control system is suitably programmed to perform the below steps. This means that the program may for example be hard-wired into the control system. In terms of engineering efficiency and flexibility, it is preferred that the electronic control system includes a programmable microprocessor. Here, the control system being programmed to perform certain steps is construed to mean that the program provides the functionality of the prescribed steps, yet without the requirement of the program actually defining or using the parameters (angles, times) used to describe the functionality.

Step a) involves detecting whether the orientation is such that the tilt angle TA remains at a constant value A1 between a first pair of setpoint angles SA1 and SA2 for at least a preset period of time T1. Here, SA1 and SA2 are preferably selected such that if the lid is stably closed, TA is within the range from SA1 to SA2. Typically, this corresponds to the lid being approximately horizontal. For example, the control system may be programmed such that the range of setpoint angles SA1 to SA2 corresponds to the lid being less than 40 degrees off, preferably less than 30 degrees off and even more preferably less than 20 degrees off with respect to horizontality. The time T1 is preferably selected to be long enough for it to be unlikely that the stable orientation at constant value A1 corresponds to something else than the lid stably resting on the confronting, supporting part of the enclosure. Therefore, in a practical situation, T1 is preferably at least 2 seconds, more preferably T1 is within the range of from 2 to 10 seconds and even more preferably within the range of about 4 to 6 seconds. Thus, the device tolerates being used on different enclosures even though the exact value of A1 is likely to vary between different enclosures of the same type (e.g. different toilet bowls).

In case the condition of step a is detected, step b) involves:

starting actuation of the spraying mechanism so as to prime said mechanism, or starting actuation of the spraying mechanism so as to spray an individual dose of cleaning liquid into the interior volume of the enclosure, or starting actuation of the spraying mechanism so as to combine said priming and said spraying.

This step ensures that after the tilt angle TA that corresponds to the lid being closed has been established and the device stays closed, the spraying mechanism is actuated for the first time. Whether the first actuation involves priming or not depends on the configuration of the spraying mechanism, because some such mechanisms require priming, whereas others do not, as is understood by the skilled person. If the spraying mechanism includes a piston-operated positive displacement pump, for example, it will typically require one or more pump cycles to completely fill the spraying mechanism between the reservoir and the nozzle of the system.

During the actuation of step b) the actuation of the spraying mechanism is interrupted if the tilt angle TA changes to a value outside a first maximum deviation range MDR1. This maximum deviation range is preferably chosen such that if the lid is opened sufficiently far—i.e. outside the set maximum deviation range—the spraying mechanism does not continue, but halts. An optimal maximum deviation range may be different for different spraying devices according to the invention. It may for instance depend on the type of enclosure, and is suitably selected such that at least any deliberate movement of the lid leads to interruption of the actuation, thereby enhancing the safety of the device. In a practical example, the lower boundary of the deviation range MDR1 preferably is the value of A1 minus the first lower deviation limit LDL1 and the upper boundary of the deviation range MDR1 is the value of A1 plus the first upper deviation limit UDL1. The upper and lower deviation limits UDL1 and LDL1 are preferably taken as small as possible, taking into account the tolerance of the components of the device and potential slack in the hinged attachment of the lid. The upper and lower deviation limits UDL1 and LDL1 can for instance be independently selected to have a value within a range of from 1 to 20 degrees, preferably from 3 to 18 degrees, more preferably from 5 to 15 degrees and even more preferably between 6 and 12 degrees and even more preferably from 7 to 10 degrees. For programming simplicity, it may be preferred in some instances that the upper deviation limit UDL1 and the lower deviation limits LDL1 have the same magnitude.

The most suitable response of the control system if the lid is closed again may depend on the type of spraying mechanism. Typically, the system will resume the actuation cycle once the tilt angle TA is within the maximum deviation range again. In that case it may be highly desirable if the control system is programmed to wait until the lid is in a stable position long enough for it to be unlikely that it is not closed. Alternatively, the actuation cycle may restart once the tilt angle TA is within the maximum deviation range again.

After the device has been primed or actuated, step c) involves detecting whether the orientation changes such that the tilt angle TA changes to a second constant value A2 between a second pair of setpoint angles SA3 and SA4 and thereupon remains constant for a preset period of time T2. Here, SA3 and SA4 are preferably selected such that if the lid is fully opened, TA is within the range from SA3 to SA4. Typically this corresponds to the lid being rotated to an orientation that is approximately vertical. For example, the control system may be programmed such that the range of setpoint angles SA3 to SA4 corresponds to the lid being rotated to within a range of 65 to 140 degrees, preferably 80 to 120 degrees from horizontality. Therefore, it is preferred that the range spanned by the second set of setpoint angles SA3 and SA4 does not overlap with the range spanned by the first set of setpoint angles SA1 and SA2. The time T2 is preferably selected to be long enough for it to be unlikely that the stable orientation at constant value A2 corresponds to something else than the lid stably resting in its opened position. In case the enclosure is a toilet bowl, it may be preferred that T2 is selected to a time long enough to correspond to the toilet having been used. Therefore, in a practical situation, T2 is preferably at least 1 second, more preferably T2 is within the range of from 1 to 10 seconds and even more preferably within the range of 2 to 6 seconds. Thus, the device tolerates being used on different enclosures even though the exact value of A2 is likely to vary between different enclosures of the same type (e.g. different toilet bowls).

Step d) involves progressing to step e) in case the condition of step c) is detected. By virtue of this step, the control system can be programmed to progress to require the lid having been opened long enough in between two actuations.

Step e) involves detecting whether the orientation is such that the tilt angle TA remains at a constant angle A3 between a third pair of angles SA5 and SA6 for at least a preset period of time T3, wherein SA5 equals the value of the angle A1 minus a lower tolerance angle LTA and SA6 equals the value of the angle A1 plus an upper tolerance angle UTA.

This step typically corresponds to checking whether the lid of the enclosure is closed again. A closed lid should correspond to a tilt angle TA which is close to the value of A1. However, the exact tilt angle TA may vary (slightly) from time to time, for example due to slack in the attachment of the lid to the enclosure, or the presence or resilient padding between the lid and the confronting surface of the enclosure. Therefore, the upper and lower tolerance angles UTA and LTA allow for some tolerance. The upper and lower tolerance angles UTA and LTA can for instance be independently selected to have a value within a range of from 0.5 to 10 degrees, preferably from 1 to 8 degrees and more preferably between 2 and 6 degrees and even more preferably about 4 degrees. In view of programming efficiency, the upper tolerance angle UTA and the lower tolerance angle LTA may be selected to have the same magnitude.

The time T3 is preferably selected to be long enough for it to be unlikely that the stable orientation at constant value A3 corresponds to something else than the lid stably resting on the confronting, supporting part of the enclosure. Therefore, in a practical situation, T3 is preferably at least 1 second, more preferably T1 is within the range of from 1 to 10 seconds and even more preferably within the range of about 2 to 6 seconds. Thus, the device tolerates being used on on an enclosure even though the exact value of A3 is likely to vary somewhat upon opening and reclosing of the lid.

In case the condition of step e is detected, step f) involves starting actuation of the spraying mechanism so as to spray an individual dose of cleaning liquid into the interior volume of the enclosure.

In a similar way as in step b), the actuation of the spraying mechanism in step f) is interrupted if the tilt angle TA changes to a value outside a second maximum deviation range MDR2. Like in step b) this second maximum deviation range is preferably chosen such that if the lid is opened sufficiently far—i.e. outside the set maximum deviation range—the spraying mechanism does not continue, but halts. An optimal maximum deviation range may be different for different spraying devices according to the invention. It may for instance depend on the type of enclosure, and is suitably selected such that at least any deliberate movement of the lid leads to interruption of the actuation, thereby enhancing the safety of the device. In practical a example, the lower boundary of the deviation range MDR2 preferably is the value of an angle A4 minus the first lower deviation limit LDL2 and the upper boundary of the deviation range MDR2 is the value of A4 plus the first upper deviation limit UDL2. The angle A4 is suitably selected from A1 and A3, preferably A4 equals A1. The upper and lower deviation limits UDL2 and LDL2 are preferably taken as small as possible, taking into account the tolerance of the components of the device and potential slack in the hinged attachment of the lid. The upper and lower deviation limits UDL2 and LDL2 can for instance be independently selected to have a value within a range of from 1 to 20 degrees, preferably from 3 to 18 degrees, more preferably from 5 to 15 degrees and even more preferably between 6 and 12 degrees and even more preferably from 7 to 10 degrees. For programming simplicity, it may be preferred that the upper deviation limit UDL2 and the lower deviation limits LDL2 have the same magnitude. Furthermore, it may be preferred that UDL2 equals UDL1 and LDL2 equals LDL1.

The most suitable response of the control system if the lid is closed again may depend on the type of spraying mechanism in the same way as described above regarding step b.

Step g) involves optionally repeating steps c to f, because in this way the electronic control system—like the spraying mechanism—is suitable for repeatedly spraying individual doses of a cleaning liquid into the interior volume of the enclosure. Whether or not the steps c to f are repeated is suitably made conditional to one or more other parameters relating to the functionality of the device, for instance the battery power level, the amount of liquid still available for spraying or the total number of actuations that has already passed. Step g) itself is suitably also repeated, in other words, the device is typically configured to allow more than two actuations. Thus, for example a typical device according to the invention intended for consumer use, e.g. in a toilet, would be configured to include a reservoir and be programmed such that it enables between 10 and 1000, preferably between 20 and 500, more preferably between 50 and 150 actuations before the reservoir requires refilling or replacing.

Combinations of preferred features with regard to the above steps a, b, c, d, e, and f of the optional program are contemplated too.

In particularly, it is preferred that the electronic control system is programmed such that, when the device is attached to the lid of an enclosure:

- SA1 and SA2 are selected such that if the lid is stably closed, TA is within the range from SA1 to SA2;
- SA3 and SA4 are selected such that if the lid is fully opened, TA is within the range from SA3 to SA4; and
- the range spanned by the second set of setpoint angles SA3 and SA4 does not overlap with the range spanned by the first set of setpoint angles SA1 and SA2.

It is more preferred that the electronic control system is programmed such that, when the device is attached to the lid of an enclosure:

- SA1 and SA2 are selected such that if the lid is stably closed, TA is within the range from SA1 to SA2;
- SA3 and SA4 are selected such that if the lid is fully opened, TA is within the range from SA3 to SA4;
- the range spanned by the second set of setpoint angles SA3 and SA4 does not overlap with the range spanned by the first set of setpoint angles SA1 and SA 2;
- T1 is within the range of from 2 to 10 seconds;
- T2 is within the range of from 1 to 10 seconds;
- T3 is within the range of from 1 to 10 seconds
- the lower boundary of the first deviation range MDR1 is the value of A1 minus the first lower deviation limit LDL1 and the upper boundary of the deviation range MDR1 is the value of A1 plus the first upper deviation limit UDL1
- the first upper and lower deviation limits UDL1 and LDL1 are independently selected to have a value within a range of from 1 to 20 degrees;
- the upper and lower tolerance angles UTA and LTA are independently selected to have a value within a range from 0.5 to 10 degrees;
- the lower boundary of the deviation range MDR2 is the value of an angle A4 minus the first lower deviation limit LDL2 and the upper boundary of the deviation range MDR2 is the value of A4 plus the first upper deviation limit UDL2;
- the angle A4 is selected from A1 and A3, whereby A4 preferably equals A1; and
- the second upper and lower deviation limits UDL2 and LDL2 are independently selected to have a value within a range of from 1 to 20 degrees.

The angles of SA1, SA2, SA3, and SA4 that correspond to the lid being closed or open, respectively, depend on the definition of TA. Therefore, it is preferred that:

- TA is the acute angle between the upward vertical direction and the direction normal to the base plane of the device and pointing from the device to the lid upon attachment thereto;

SA1 is selected to have a value between −40° (minus 40 degrees) and −5°, more preferably between −30° and −10° and even more preferably between −25° and −15°;

SA2 is selected to have a value between 5° (5 degrees) and 40°, more preferably between 10° and 30° and even more preferably between 15° and 25°;

SA3 is selected to have a value between 60° (60 degrees) and 90°, more preferably between 65° and 80°; and SA4 is selected to have a value between 90° (90 degrees) and 135 degrees, more preferably between 100° and 120°.

It is more preferred that

TA is the acute angle between the upward vertical direction and the direction normal to the base plane of the device and pointing from the device to the lid upon attachment thereto;

SA1 is selected to have a value between −25° and −15°;

SA2 is selected to have a value between 15° and 25°;

SA3 is selected to have a value between 65° and 80°; and

SA4 is selected to have a value between 100° and 140°.

It is even more preferred that

TA is the acute angle between the upward vertical direction and the direction normal to the base plane of the device and pointing from the device to the lid upon attachment thereto;

SA1 is selected to have a value between −25° and −15°;

SA2 is selected to have a value between 15° and 25°;

SA3 is selected to have a value between 65° and 80°;

SA4 is selected to have a value between 100° and 140°;

T1 is within the range of from 2 to 10 seconds;

T2 is within the range of from 1 to 10 seconds;

T3 is within the range of from 1 to 10 seconds the lower boundary of the first deviation range MDR1 is the value of A1 minus the first lower deviation limit LDL1 and the upper boundary of the deviation range MDR1 is the value of A1 plus the first upper deviation limit UDL1 the first upper and lower deviation limits UDL1 and LDL1 are independently selected to have a value within a range of from 5 to 15 degrees;

the upper and lower tolerance angles UTA and LTA are independently selected to have a value within a range from 0.5 to 10 degrees;

the lower boundary of the deviation range MDR2 is the value of an angle A4 minus the first lower deviation limit LDL2 and the upper boundary of the deviation range MDR2 is the value of A4 plus the first upper deviation limit UDL2;

the angle A4 is selected from A1 and A3, whereby A4 preferably equals A1; and the second upper and lower deviation limits UDL2 and LDL2 are independently selected to have a value within a range of from 5 to 15 degrees.

The optional electronic control system may suitably be programmed to perform optional additional steps before, after or between any of the above-specified program steps a) to g). It may also be programmed to run processes in parallel to those program steps.

Thus, actuation of the device may be made subject to the presence of liquid in the reservoir (if any) or the presence of a cartridge containing the liquid and/or the attachment of the device to the lid or a mounting plate. These conditions may suitably be sensed by switches that interrupt an electric circuit once one of these conditions for safe functioning of the device is removed. It may be beneficial if such switches interrupt the main power supply to the electronic control system, thereby preventing any undesired actuations.

The program may suitably incorporate an additional step before step a) in which an orientation corresponding to the lid being fully and stably opened is detected and progression to stap a) is made conditional on this orientation having occurred. This would enhance the safety and reliability of the device, because it makes it further less likely that the device is operated without actually having been mounted to the lid of the enclosure. This applies especially if the enclosure is a toilet bowl, since it would be hard for a user to attach the device to the lid without the lid being opened. This step typically involves detecting whether the orientation changes such that the tilt angle TA changes to a fifth constant value A5 between a fourth pair of setpoint angles SA7 and SA8 and thereupon remains constant for a preset period of time T4. The preferences expressed hereinabove with regard to SA3, SA4 and T2 also apply to SA7, SA8 and T4, respectively, because the function of this step is comparable to that of step c).

A typical cleaning and/or disinfecting liquid may require some contact time on the inner surface of the enclosure in order to obtain optimal performance. In case the enclosure is a toilet, it is typically flushed after use (e.g. for urinating, defecating, emesis or the like). It is desirable to delay actuation of the device, after closing of the lid was detected (e.g. before commencing the actuation of steps b and/or f), until after the flushing. The delay may for example be programmed to last a fixed time interval or to respond to a sensor sensing the flushing.

Several components of the spraying mechanism and or the electronic control system may have a duty cycle that is less than 100%. In other words, several components, or their particular combination in the device, may require a minimum rest period after one or a certain number of actuations, for instance to prevent damage due to overload, overheating, friction, other sources of wear, or run dry (because refilling the spraying mechanism with liquid is not instantaneous). Moreover, if a toilet or other enclosure is intensely used, it may be desirable if the device is not actuated after every opening and reclosing of the lid. Thus, in operation, actuation may be made conditional to the number of actuations that occurred within a given time preceding the present closing of the device. Thus, the number of actuations could for instance be limited to a maximum of a set number between 1 and 20, more preferably between 5 and 15, or even more preferably about 10 actuations within 24 hours. Alternatively or additionally, actuation may be made subject to the condition that the last actuation is at least a certain time ago, for instance at least ten minutes or at least one hour.

The program may also include separate subroutines that are activated in case the power supply is running low (as sensed e.g. by a drop in the voltage). Such subroutines may desirably trigger a warning signal to the user to replace the batteries. In order to save battery life to allow repeatedly instructing the user to replace the batteries, the activation of such a warning signal may suitably be made dependent on the lid having been closed and reopened: Especially if the signal is visual, the user will only be able to see it if the lid is opened. As a further safety feature, the program may activate a further subroutine when the batteries are critically low. Typically, such a subroutine would provide the same warning signal to the user, but would prevent the device from actuation. Thus, a situation in which actuation becomes unpredictable because of power failure is avoided. Similar subroutines may also be provided with regard to the liquid stock still present, for instance by direct sensing of the liquid level or by counting the number of actuations since refilling or replacing the liquid reservoir.

In order to detect whether the orientation satisfies any of the above-described conditions, or whether it deviates from such a condition, the electronic control system may for instance be programmed to read the signal of the tilt sensor at regular intervals. Typically, these intervals are small with respect to the time scales required for the mechanism to respond to the change of orientation. Suitably, these detection time intervals may be made shorter for detection of changes to the orientation that are more critical to the safe operation of the device. A typical electronic control system could suitably be programmed to detect the orientation at regular intervals, selected from a range of 1 to 100, preferably 5 to 50, and more preferably about 10 microseconds. Many typical tilt sensors suitable for use in the present device provide a transient or static readable signal that is dependent on the proper acceleration experienced by the sensor. This applies for instance to accelerometers and similar microelectromechanical sensors. When the device is at rest, the proper acceleration corresponds to the direction of the earth's gravitational field and will thus provide a convenient reference for the orientation of the device.

(Accelerated) motion will cause the proper acceleration to deviate from the gravitational acceleration. In particular, motion of the device due to movement of its internal parts may be a source of such noise. Therefore, it is desirable to enable the control system to avoid staggering of the spraying mechanism by cancelling out noise in the signal from the tilt sensor. Such noise typically includes continuous noise—for instance caused by vibrations originating e.g. from an electromotor driving the spraying mechanism or a piezoelectric element—and/or single shock noise, e.g. if the spraying mechanism is piston-operated.

As explained above, certain tilt sensors (in particular tri-axis accelerometers and the like) will also provide electronically readable signals relating to motion and or orientation outside the plane of rotation defined by the hinged attachment of the lid. In order to further enhance the safety and reliability of the device, the control system may suitably be programmed to use such signals e.g. to detect disruptions to the normal opening and closing of the lid and/or misalignment of the device. Such misalignment might for instance occur if the device is designed to be aligned in a particular way with respect to the plane of rotation of the lid of the enclosure, e.g. to allow recharging of the spraying mechanism by virtue of gravity once the lid is opened and closed again.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A compact spraying device (10) connectable to a surface and for spraying a fluid, the spraying device comprising:

a housing (16) with a front side, a back side, and an inlet (20) for receiving the fluid to be sprayed;

a pump (28) in fluid communication with the inlet (20);

a retractable nozzle (24) in fluid communication with the pump (28), wherein the retractable nozzle (24) selectively extends forward relative to the front side of the housing into a spraying position for spraying the fluid and retracts inside the housing to a retracted position when not spraying;

a nozzle cover (22) connected to the housing which is selectively moveable from a closed position in which the cover (22) covers the nozzle (24) when the nozzle is in a retracted position, to an open position in which the cover (22) moves to allow the nozzle (24) to extend into the spraying position; and a drive system (30) for moving the retractable nozzle (24) and the nozzle cover (22) and operating the pump (28);

the spraying device (10) further comprising a control system (38) to control the spraying device (10); wherein the control system (38) comprises one or more sensors which signal when to move the cover (22) and retractable nozzle (24) into a spraying position and operate the pump (28); and wherein the one or more sensors, of the spraying device (10) connectable to a rotatable surface, comprises an accelerometer.

2. The spraying device (10) of claim 1, and further comprising:

a reservoir (12) for containing the fluid, the reservoir in fluid communication with the inlet (20) of the housing (16).

3. The spraying device (10) of claim 2, wherein the housing (16) comprises a mounting portion (18) for the reservoir (12).

4. A compact spraying device (10) connectable to a surface and for spraying a fluid, the spraying device comprising:

a housing (16) with a front side, a back side, and an inlet (20) for receiving the fluid to be sprayed;

a pump (28) in fluid communication with the inlet (20);

a retractable nozzle (24) in fluid communication with the pump (28), wherein the retractable nozzle (24) selectively extends forward relative to the front side of the housing into a spraying position for spraying the fluid and retracts inside the housing to a retracted position when not spraying;

a nozzle cover (22) connected to the housing which is selectively moveable from a closed position in which the cover (22) covers the nozzle (24) when the nozzle is in a retracted position, to an open position in which the cover (22) moves to allow the nozzle (24) to extend into the spraying position; and a drive system (30) for moving the retractable nozzle (24) and the nozzle cover (22) and operating the pump (28);

wherein the nozzle cover (22) is slidable between the open position and the closed position through a scotch yoke mechanism driven by the drive system (30).

5. The spraying device (10) of claim 4, and further comprising:

a reservoir (12) for containing the fluid, the reservoir in fluid communication with the inlet (20) of the housing (16).

6. The spraying device (10) of claim 5, wherein the housing (16) comprises a mounting portion (18) for the reservoir (12).

7. The spraying device (10) of any of claim 1, and further comprising a control system (38) to control the spraying device (10).

8. The spraying device (10) of claim 7, wherein the control system (38) comprises one or more sensors which signal when to move the cover (22) and retractable nozzle (24) into a spraying position and operate the pump (28).

9. The spraying device (10) of claim 8 connectable to a rotatable surface, wherein the one or more sensors comprises an accelerometer.

10. The spraying device (10) any of claim 1, wherein the nozzle cover (22) comprises:

a face portion (40) which covers the nozzle (24) in the closed position and is moveable to allow the nozzle (24) to extend in the open position;

first and second rails (42) connected to the face portion (40), the first and second rails (42) positioned to slide along first and second tracks (50) in the device to guide the movement of the cover (22); and a slot (44) for receiving a pin (54) which moves the cover (22) along the first and second tracks (50).

11. The spraying device (10) of claim 10, wherein the nozzle cover (22) further comprises:

a first slot (43) on the first rail (42) to receive a first projection (46) connected to the nozzle (24); and a second slot (43) on the second rail (42) to receive a second projection (46) connected to the nozzle (24), wherein the first slot (43) and the second slot (43) are shaped so that the nozzle (24) moves into the spraying position as cover (22) moves into the open position and so that the nozzle (24) moves into the retracted position when cover (22) moves into the closed position.

12. The spraying device (10) of claim 1, wherein one of the nozzle cover (22) and the nozzle (24) are configured to be driven by the drive system (30), and the other of the nozzle cover (22) and the nozzle (24) are configured to be driven by the movement of the one driven by the drive system.

13. The spraying device (10) of claim 1, and further comprising:

a mounting system (56) for connecting the back side of the housing (16) to a surface.

14. Use of the spraying device (10) of claim 1, as a toilet spraying device for mounting to a lid (14) of a toilet.

* * * * *